July 24, 1962 J. M. HILLEGAS 3,045,743

CROWN CAP DISK INSERTING APPARATUS

Filed Jan. 20, 1959 5 Sheets-Sheet 1

INVENTOR
JULIAN M. HILLEGAS

BY Mason, Porter, Diller & Stewart
ATTORNEYS

July 24, 1962 J. M. HILLEGAS 3,045,743

CROWN CAP DISK INSERTING APPARATUS

Filed Jan. 20, 1959 5 Sheets-Sheet 2

INVENTOR
JULIAN M. HILLEGAS

BY Mason, Porter, Diller & Stewart
ATTORNEYS

INVENTOR
JULIAN M. HILLEGAS
BY Mason, Porter, Diller & Stewart
ATTORNEYS

INVENTOR
JULIAN M. HILLEGAS
BY Mason, Porter, Diller & Stewart
ATTORNEYS

CROWN CAP DISK INSERTING APPARATUS

Filed Jan. 20, 1959 5 Sheets-Sheet 5

INVENTOR
JULIAN M. HILLEGAS

BY Mason, Porter, Diller & Stewart
ATTORNEYS

United States Patent Office 3,045,743
Patented July 24, 1962

3,045,743

CROWN CAP DISK INSERTING APPARATUS

Julian M. Hillegas, Wilmington, Del., assignor to Continental Can Company, New York, N.Y., a corporation of New York Filed Jan. 20, 1959, Ser. No. 788,018
12 Claims. (Cl. 156—567)

The invention relates generally to the art of manufacturing bottle caps and primarily seeks to provide novel means for placing cork discs in the empty metal shells, which together with the cork disc, form the entire bottle cap.

In the manufacture of bottle caps, as is disclosed in the patent to Charles E. McManus, Patent No. 1,574,913, granted March 2, 1926, the empty metal shells are automatically deposited in sockets of an endless conveyor. The empty shells are then conveyed below a rotary cork distributing device which deposits in each of the empty shells a cork disc. The cork disc may be retained within the empty shell either by pressure and the interfitting of the cork disc with the metal shell, or by an adhesive which may have been previously applied to the interior surface of the metal shell. Further, after the cork disc has been applied to the metal shell, if desired, the bottle caps may then be transferred to another machine which may apply a suitable sealing coat to the cork disc, either in the form of a wax surface or a disc of metal foil. Inasmuch as millions of bottle caps must be manufactured and since they must be economically manufactured, it is necessary that the machine which assembles the bottle caps, that is places the cork discs in the empty shells, must operate at a very high rate and must be for all practical purposes jam proof. While heretofore there have been devised automatic machines for applying the cork disc to an empty metal shell of a bottle cap at a very high rate, the prior machines were continuously subject to jamming. When the machine jammed, it was necessary to shut down the machine and to clear the machine. Inasmuch as the machine operates at a high rate, it will be seen that any shut down time resulted in a relatively great loss of production.

It is therefore the primary object of this invention to provide in a bottle cap assembling machine a rotary cork disc distributor, the cork disc distributor including a rotor which is so constructed whereby as it passes beneath a cork disc supply, it will automatically pick off a cork disc for each and every stage thereof, the rotor having for each of the stages thereof a plunger, the plunger being so constructed whereby after the cork disc has been picked off by the rotor, the plunger will hold the cork disc in place until such time as the cork disc is alined with the empty shell at which time it will simultaneously release the cork disc and forceably deposit the cork disc in the empty shell which is alined with the rotor at the particular instance.

Another object of this invention is to provide a rotary cork disc distributor for use in a bottle cap assembling machine, the cork disc distributor including a rotor which has a plurality of identical stages, each of the stages including a plunger and a pick-off shoulder, the pick-off shoulder being so constructed whereby the association of a cork disc with each and every plunger as it rotates beneath a cork disc supply is assured, there being associated with the plunger both a vacuum source and a compressed air source whereby the retention of the cork disc relative to the plunger as the rotor rotates is assured and at the same time the release and projection of the cork disc into an empty bottle cap shell as the plunger comes into alinement with the empty shell is also assured.

Another object of the invention is to provide a rotary cork distributor for placing cork discs in empty shells in the assembling of bottle caps, the cork disc distributor being provided with a rotor which has mounted therein a plurality of plungers, the plungers being normally retracted within the rotor and there being provided cam means for projecting the plungers as they become alined with empty shells, and there being provided a stripper plate so shaped and positioned with respect to the projected plungers whereby in the event the means for forcing a cork disc from the plunger fails, the stripper plate will remove the cork disc from the plunger prior to the retraction thereof into the rotor.

Another object of this invention is to provide a rotary distributor for applying cork discs to empty shells in the assembling of bottle caps, the rotary distributor including a compressed air source which is disposed behind the cork disc as it becomes alined with the socket of a conveyor which normally carries an empty shell so that in the event the conveyor socket is devoid of an empty shell, the cork disc will be forced through the conveyor socket so that the conveyor socket may be retained free for the reception of an empty shell during the next passing of that particular conveyor socket past an empty shell supply in order to prevent clogging and jamming of the conveyor.

A further object of the invention is to provide a rotary distributor for applying cork discs to empty shells in the manufacture of bottle caps, the rotary distributor including a rotor having mounted therein a plurality of plungers, the rotor having a cork disc pick-off shoulder for each of the plungers, and there being provided both a compressed air source and a vacuum source, the compressed air source and the vacuum source being connected to the plungers by means of a valve plate which is of such a nature whereby as the rotor rotates, the shoulder thereof will first pick off a cork disc from a cork disc supply, the cork disc will then be permitted to settle within the socket of the rotor receiving the plunger, after which a vaucum is applied to the face of the plunger against which the cork disc bears so as to hold the cork disc in position on the plunger by vacuum as the rotor and plunger rotate, and finally when the plunger is alined with an empty shell, discontinuing the vacuum and immediately thereafter applying a compressed air pressure against the cork disc to urge the cork disc away from the plunger and into an empty shell.

With the above and other objects in view that will hereinafter appear, the nature of the invention will be more clearly understood by following the detailed description, the appended claims, and the several views illustrated in the accompanying drawings.

Figure 1:
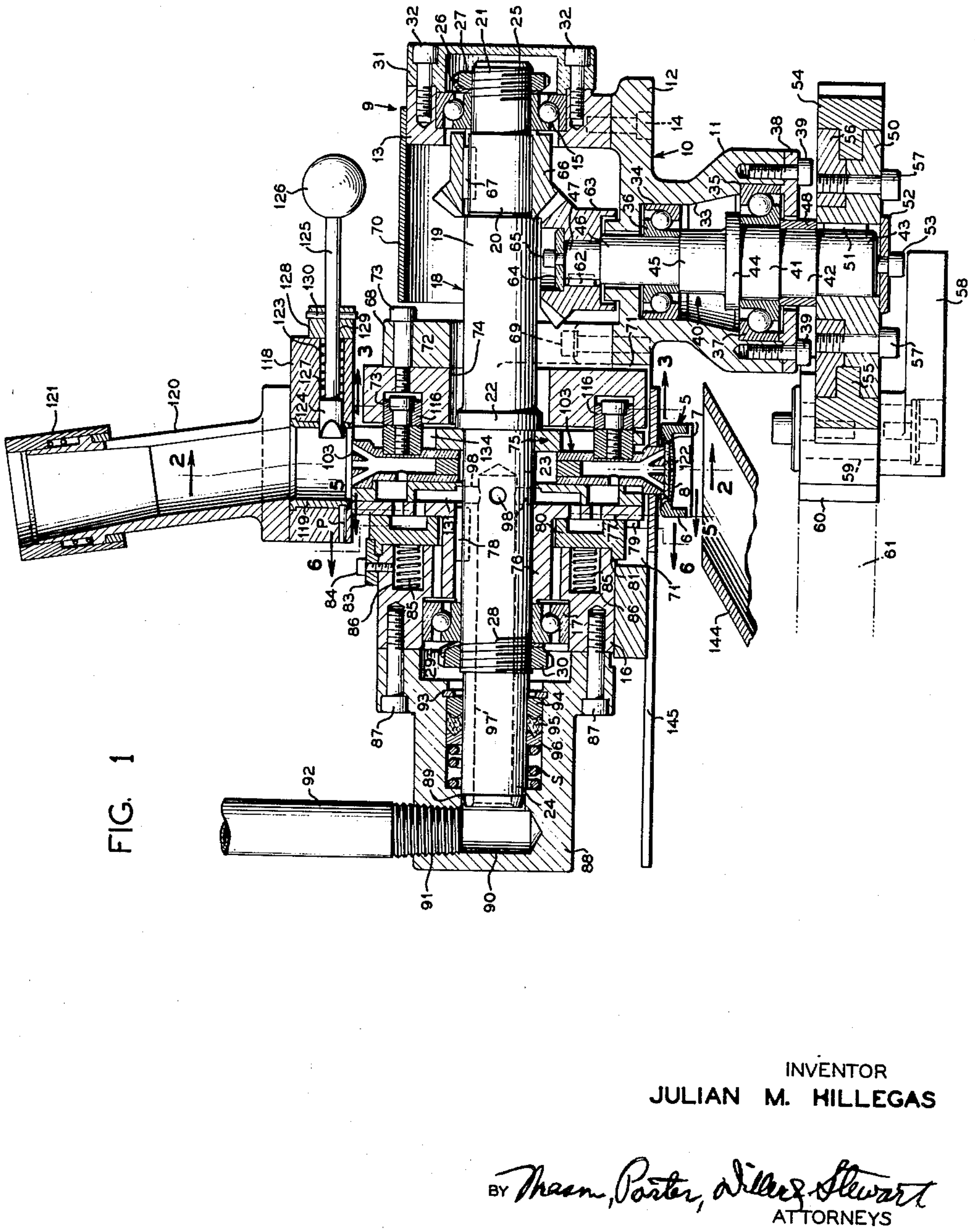
FIGURE 1 is a transverse vertical sectional view taken through the center of the rotary cork distributor and shows the relationship of the various components thereof.

In the example of embodiment of the invention disclosed herein, the usual endless conveyor for empty shells is indicated at 5. The endless conveyor 5 in itself is not a novel part of the invention and includes a plurality of identical links 6, which links are each provided with a socket 7 for the reception of an empty metal shell 8 of a bottle cap. The empty shells 8 may be placed in the sockets 7 in any conventional manner, including that disclosed in the McManus Patent No. 1,574,-913.

Alined with the endless conveyor 5 is the rotary cork distributor which is the subject of this invention. The rotary cork distributor is referred to in general by the reference numeral 9 and includes a base 10. The base 10 may be of any construction, but preferably is in the form of a casting having a horizontal plate portion 12 and a tubular depending portion 11. Seated on the right part of the plate portion 12, as viewed in FIGURE 1, is an upstanding bearing block 13. The bearing block 13 is secured in place by means of fasteners 14. Carried by the bearing block 13 is a thrust bearing 15.

Secured to the left part of the plate portion 12 and projecting upwardly therefrom is a pillow block 16 in which there is positioned a thrust bearing 17. The pillow block 16 is secured to the plate portion 12 of the base 10 by suitable fasteners (not shown) with the bearing 17 in alinement with the bearing 15.

Extending through the bearings 15 and 17 and rotatably journaled therein is a shaft 18. The shaft 18 includes an enlarged central portion 19 which has integrally connected to the right end thereof an intermediate portion 20 and a reduced end portion 21. At the left end of the central portion 19 there is formed an enlarged annular shoulder 22 which defines the intersection between the central portion 19 and an intermediate portion 23. Formed integral with the left end of the intermediate portion 23 is a reduced portion 24. The reduced portion 21 is journaled in the bearing 15 and the intermediate portion 23 is journaled in the bearing 17.

The extreme end part of the reduced end portion 21 is externally threaded as at 25. Engaged over the end portion 21 and suitably keyed thereto is a lock washer 26. The lock washer 26 bears against the bearing 15 and is engaged by a nut 27 threaded on the end portion 21. The nut 27 and lock washer 26 prevent movement of the shaft 18 to the left, as viewed in FIGURE 1.

The left end part of the intermediate portion 23 of the shaft 18 is externally threaded as at 28. Suitably keyed on the intermediate portion 23 and bearing against the bearing 17 is a lock washer 29. Clampingly engaging the lock washer 29 and threadedly engaged on the intermediate portion 23 is a retaining nut 30. The lock washer 29 and the retaining nut 30 serve to prevent movement of the shaft 18 to the right.

In order to eliminate the exposure of any of the rotating parts of the shaft 18, and at the same time to retain lubrication in the bearing 15, there is secured to the bearing block 13 a bearing cap 31. The bearing cap 31 is secured in place by means of a plurality of circumferentially spaced cap screws 32 which are threaded into the bearing block 13.

The depending tubular portion 11 of the base 10 has a vertical opening 33 therethrough which defines an upper bearing seat 34 and a lower bearing seat 35. Seated in the upper bearing seat 34 is a bearing 36. A similar bearing 37 is seated in the lower bearing seat 35. The bearing 37 is retained in the bearing seat 35 by means of a bearing cap 38 which is secured to the lower end of the tubular portion 11 by means of a plurality of fasteners 39.

The bearings 36 and 37 are alined and have extending therethrough a drive shaft which is referred to in general by the reference numeral 40. The drive shaft 40 includes a large central portion 41 which is received in the bearing 37. Disposed immediately below the enlarged central portion 41 is a smaller intermediate portion 42 and a reduced end portion 43. The upper end of the central portion 41 is defined by means of a shoulder 44 which abuts against the upper surface of the bearing 37 and restricts downward movement of the drive shaft 40. Disposed next above the shoulder 44 is a first upper intermediate portion 45. Disposed above the first upper intermediate portion 45 is a second upper intermediate portion 46 which in turn terminates in a reduced end portion 47. The first upper intermediate portion has the upper end thereof in abutment against the underside of the bearing 36 which is in turn journaled on the second upper intermediate portion 46. A spacing sleeve 48 is carried by the intermediate portion 42.

Keyed on the end portion 43 is a hub 50. The hub 50 is connected to the shaft 40 for rotation therewith by means of a key 51. The hub 50 is also retained in place on the drive shaft 40 by means of a washer 52 and a fastener 53 which is threadedly engaged in the lower end of the drive shaft 40.

Mounted on the hub 50 is a gear 54. The gear 54 is an annular type gear and is T-shaped in cross-section, the gear 54 including a web 55. Overlying the web 55 and engaging the hub 50 is a clamp plate 56. The clamp plate 56 is retained in place by means of a plurality of circumferentially spaced fasteners 57.

Disposed adjacent the gear 54 is a bracket 58. The bracket 58 has rotatably journaled therein and projecting upwardly therefrom an idler shaft 59. Suitably secured to the idler shaft 59 for rotation therewith is an idler gear 60. The idler gear 60 is meshed with the drive gear 54. It is to be understood that the bracket 58 will be mounted on any suitable supporting frame which is fixed relative to the endless conveyor 5. Also, the idler gear 60 will be driven in timed relation to the movement of the conveyor 5 by means of a drive element 61. The manner in which the bracket 58 is mounted and the manner in which the idler gear 60 is driven play no part in this invention. Also, the manner in which the base 10 is mounted plays no part in this invention.

Keyed on the reduced upper end of the drive shaft 40 by means of a key 62 is a bevel gear 63. The bevel gear 63 is held in place by means of a washer 64 and a fastener 65. In mesh with the bevel gear 63 is a bevel gear 66 which is keyed on the intermediate portion 20 of the shaft 18 by means of a key 67.

Secured to the plate portion 12 of the base 10 to the left of the bevel gear 63 is a bracket 68. The bracket 68 is removably secured to the base 10 by means of fasteners 69. The bracket 68 is generally of an inverted U-shaped outline with the lower portion thereof relieved to provide space for the bevel gear 63. The bearing block 13, together with the bracket 68, define a housing for the bevel gears 63 and 66. The housing is completed by means of a removable shield 70.

Figure 2:
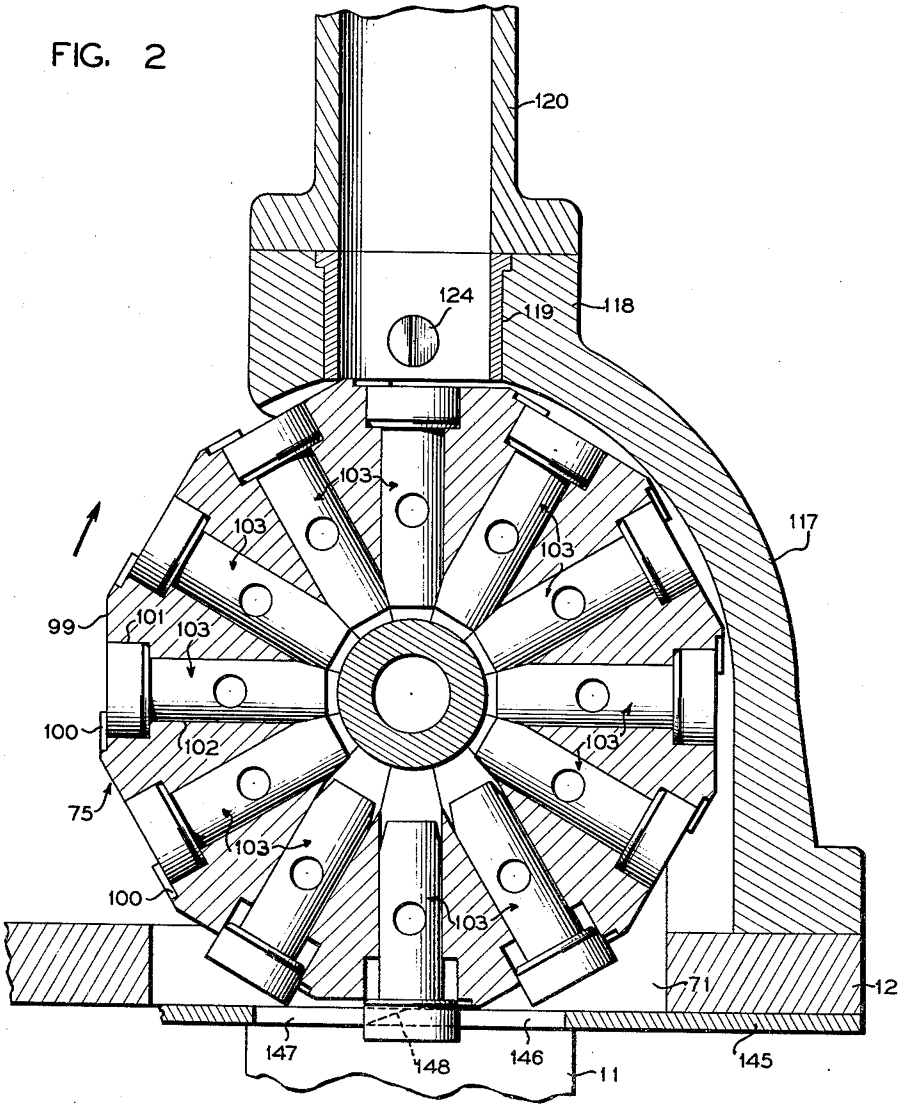
FIGURE 2 is an enlarged fragmentary vertical sectional view taken on the line 2—2 of FIGURE 1 and shows the specific details of the rotor and the relationship of the plungers carried thereby.
Figure 3:
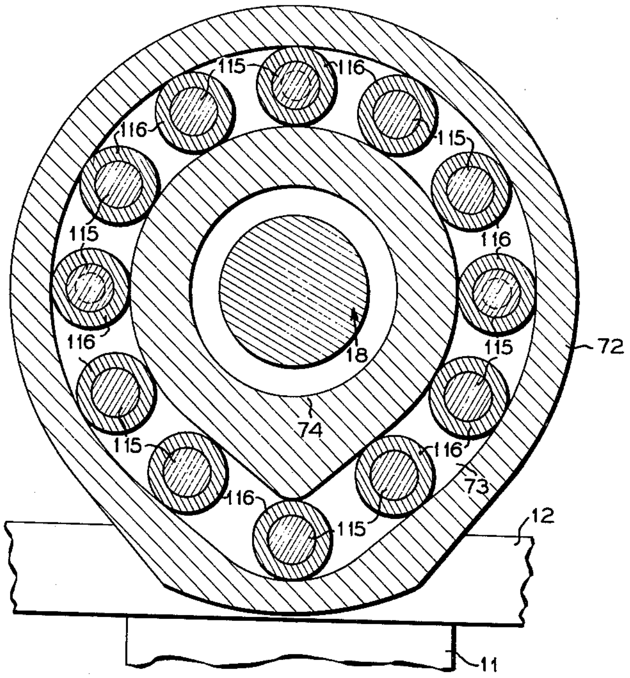
FIGURE 3 is an enlarged fragmentary vertical sectional view taken on the line 3—3 of FIGURE 1 and shows the specific details of a cam plate for projecting the plungers from the rotor.

Disposed immediately to the left of the bracket 68 is a cam plate 72. The cam plate 72 is secured to the bracket 68 by means of fasteners 73 and projects downwardly into an opening formed in the plate portion 12 of the base, the opening being referred to by the reference numeral 71. As is best shown in FIGURE 2, the opening 71 is relatively wide as compared to the remainder of the plate portion 12 of the base 10 at the point of the opening 71. As is best shown in FIGURE 3, the cam plate 72 has formed in the left face thereof, as viewed in FIGURE 1, a cam track 73. Also, the cam plate 72 has an enlarged opening 74 through which the shaft 18 passes.

Disposed next to the cam plate 72 and mounted on the intermediate portion 23 of the shaft 18 in abutment with the shoulder 22 is a rotor, which is referred to in general by the reference numeral 75. The details of the rotor 75 will be described hereinafter. Also mounted on the intermediate portion 23 of the shaft 18 is a hub portion 76 of a drive plate 77. The hub portion 76 is keyed onto the shaft 18 for rotation therewith by means of the key 78. The drive plate 77 has connected thereto, by means of fasteners 79, the rotor 75.

Disposed intermediate the drive plate 77 and the right end of the pillow block 16 is a valve plate 80. The valve plate 80 is centered with respect to the shaft 18 by means of an interlock with the pillow block 16 as at 81 and is provided with a central opening 82 to permit the passage of the hub portion 76 of the drive plate 77. The valve plate 80 is retained against rotation by means of a locking finger 83 removably secured to the upper part of the pillow block 16 by means of a fastener 84. However, the valve plate 80 is longitudinally slidable with respect to the base 10 and is retained in frictional sealed engagement with the drive plate 77 by means of coil springs 85 which are seated in circumferentially spaced recesses formed in the right end portion of the pillow block 16.

Secured to the left end of the pillow block 16 by means of circumferentially spaced fasteners 87 is a gland member 88. The gland member 88 has a horizontal bore 89 receiving the end portion 24 of the shaft 18. Extending vertically through the upper part of the gland member 88 and intersecting the horizontal bore 89 at the end thereof is a passage 90. The passage 90 has an upper internally threaded portion 91 in which there is threadedly engaged an end of a vacuum line 92. The vacuum line 92 may be connected to any desired vacuum source.

In order that the gland member 88 may be sealed with respect to the rotating shaft 18, there is positioned in the right part of the bore 89 a retaining ring 93. Bearing against the retaining ring 93 is a support ring 94 for a V-type packing 95. A second support ring 96 engages the left surface of the packing 95. The support ring 96 is engaged by a coil spring S so as to compressively retain the packing 95 between the support rings 94 and 96.

The left part of the shaft 18, as viewed in FIGURE 1, has a central bore 97 which opens through the left end thereof into the bore 89 at its intersection with the passage 90. Thus the longitudinal bore 97 is communicated with the vacuum line 92. The bore 97 terminates at its right end generally in alinement with the rotor 75. Intersecting the bore 97 in alinement with the left part of the rotor 75, as viewed in FIGURE 1, is a plurality of radiating passages 98. The passages 98 open through the exterior surface of the shaft 18.

Figure 4:
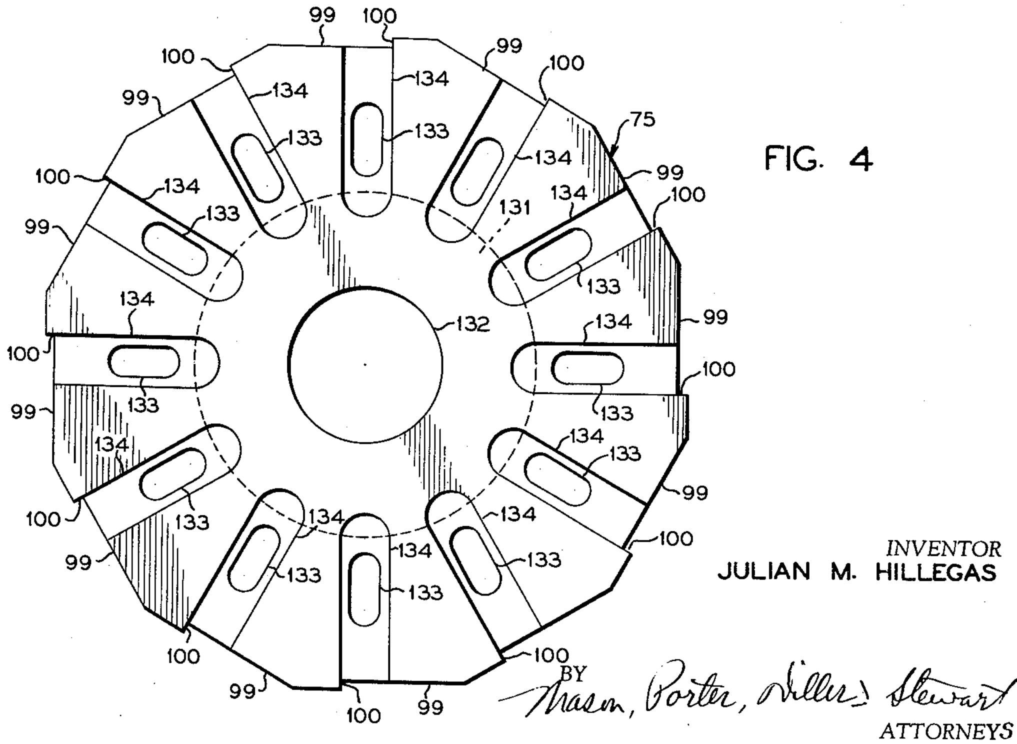
FIGURE 4 is an enlarged elevational view of the right side of the rotor, as viewed in FIGURE 1, and shows the arrangement of the various plunger receiving sockets thereof.

Referring now to FIGURES 2 and 4 in particular, it will be seen that the rotor 75 is a multi-sided member. The peripheral surface of the rotor 75 includes a plurality of flat surface portions 99 which, as viewed in FIGURE 4, terminate in a clockwise direction in a shoulder 100. The shoulder 100, as is best shown in FIGURE 2, is arcuate so as to conform generally to the outline of a cork disc, the shoulder 100 intended to be a pick-off shoulder. Disposed normal to each of the surfaces 99 and lined with the shoulder 100 thereof is a socket 101. The socket 101 extends in radial relation with respect to the rotor 75 and has a reduced inner portion 102. Seated in each of the sockets 101 is a plunger which is referred to in general by the reference numeral 103.

Referring now to FIGURES 7–12, inclusive, it will be seen that the plunger 103 includes an elongated tubular body portion 104 having a longitudinal bore 105 therethrough. The lower or inner end of the body portion 104 is tapered on diametrically opposite sides thereof as at 106 to provide clearance for the next adjacent plungers 103. The inner end of the bore 105 is closed by means of a plug 107.

The plunger 103 also includes an enlarged head 108 which is integrally formed on the outer or upper end of the plunger body 104. The head 108 has formed therein a plurality of diverging passages 109 which communicate with the bore 105. There is also a center passage 110. Communicating with the bore 105 is a transverse bore 111. The bore 111 is disposed generally at right angles to the surface in which the bevels 106 are formed.

The body portion 104 has formed therein in diametrically opposite relation to the bore 111 a recess 112 in which there is secured by welding or by silver solder a block 113. The block 113 has an internally threaded bore 114 in which there is threadedly engaged a fastener 115. The fastener 115 also functions as a spindle for a roller type follower 116.

As is best illustrated in FIGURES 1 and 3, the roller type followers 116 so project from the plungers 103 that they engage in the cam track 73. Further, the cam track 73 is so shaped whereby normally the plungers 103 are entirely retracted within the rotor 75. However, as the plungers 103 approach the lower end of their travel, in accordance with the shape of the camtrack 73, they are forced downwardly and out of the rotor 75 to a cork disc discharge position.

Secured to the plate portion 12 of the base 10 in alinement with the rotor 75 is a bracket 117 which terminates at the upper end thereof in a vertically disposed tubular portion 118. This is best shown in FIGURE 2. Seated in the tubular portion 118 is a bushing 119 which functions as a cork guide. Secured to the tubular portion 118 and projecting upwardly therefrom is a tubular cork disc stacking pipe 120. Resiliently mounted on the upper end of the stacking pipe 120 for limited sliding movement is a fitting 121 for a delivery hose (not shown) whereby a supply of cork discs, such as the cork disc 122 may be continuously delivered from a hopper, as is disclosed in the McManus Patent No. 1,574,913.

The bushing 119 is retained in place by means of a pin P, as is shown in FIGURE 1. Also, extending through the tubular portion 118 of the bracket 117 is a horizontal bore 123 which also opens through the bushing 119. Slidably mounted in the bore 123 is a cork retaining finger 124 which is mounted on one end of a shaft 125. The opposite end of the shaft 125 is provided with a ball type handle 126. Inward movement of the cork retaining finger 124 is urged by means of a coil spring 127 also disposed within the bore 123.

Secured to the outer surface of the tubular portion 118 is a cam 128. The cam 128 has a bore 129 alined with the bore 123 and receiving the shaft 125. The shaft 125 carries a transverse pin 130 which is engaged with the cam 128 for the purpose of retaining the cork retaining finger 124 in a retracted position, the cork retaining finger 124 being illustrated in a projecting cork retaining position in FIGURE 1.

Formed in the left surface of the rotor 75, as viewed in FIGURE 1, is an annular recess 131. The annular recess 131 extends to the central opening 132 formed in the rotor 75 for the reception of the shaft 18. Thus the passages 98 through the shaft 18 are communicated with the annular recess 131.

Also formed in the left face of the rotor 75, as viewed in FIGURE 1, are radiating elongated slots 133 which open into the socket extensions 102 and are continuously alined with the passages 111. Incidentally, the right face of the rotor 75, as viewed in FIGURE 1, is provided with an elongated slot 134 for each of the sockets 101, the slots 134 being disposed in radial relation and opening into the sockets 101 and their extensions 102 and providing clearance for the blocks 113. Thus rotation of the plungers 103 within the sockets 101 is prevented.

Figure 6:
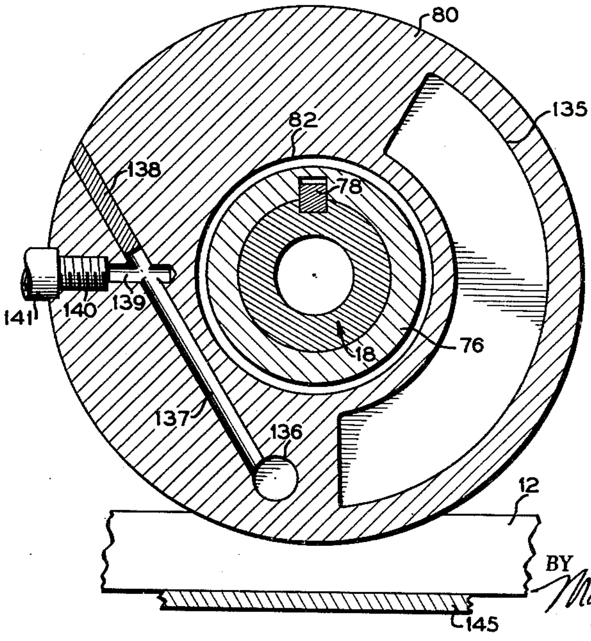
FIGURE 6 is an enlarged fragmentary vertical sectional view taken on the line 6—6 of FIGURE 1 and shows the specific details of a valve plate for controlling the applicaion of both compressed air and a vacuum to the plungers.
Figures 7, 8, 9, 10, 11, 12:
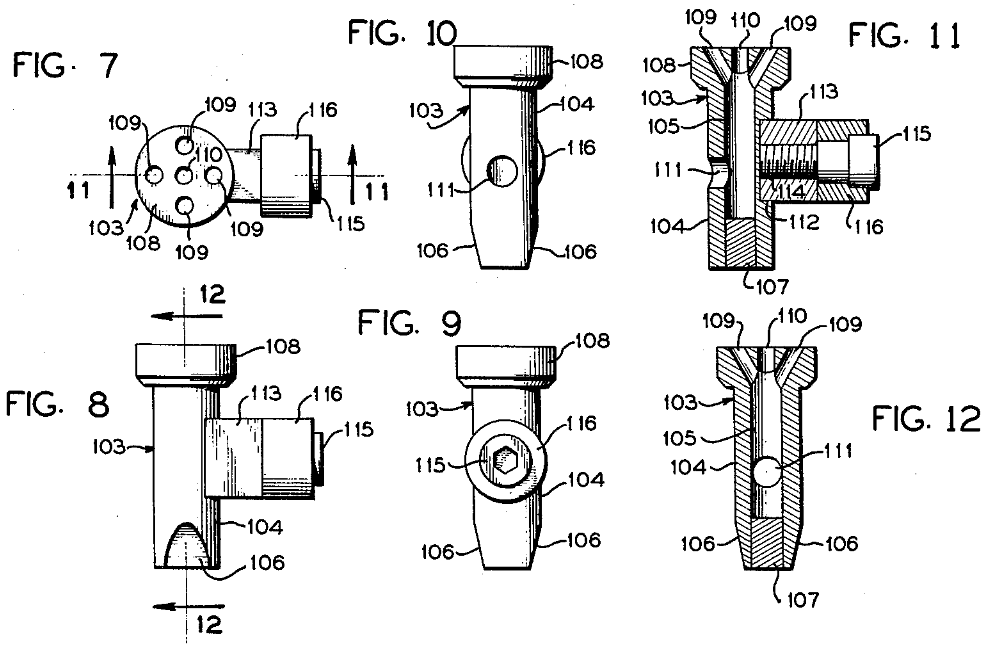
FIGURE 7 is an enlarged end view of one of the plungers and shows the arrangement of passages opening through a cork disc engaging end thereof.
FIGURES 8, 9 and 10 are elevational views on an enlarged scale showing other details of the plunger.
FIGURE 11 is an enlarged vertical sectional view taken on the line 11—11 of FIGURE 7 and shows the exact manner in which the roller type follower for the plunger is secured thereto.
FIGURE 12 is an enlarged vertical sectional view taken on the line 12—12 of FIGURE 8 and shows the arrangement of air passages formed in the plunger.

Referring now to FIGURE 6 in particular, it will be seen that the valve plate 80 has formed in the right face thereof, as viewed in FIGURE 1, an elongated arcuate passage 135 which is rectangular in cross-section and which extends from a line approximately thirty degrees from the vertical to a line parallel to the vertical at the bottom of the valve plate 80, but spaced slightly short of a vertical line through the center of the valve plate 80.

Also opening through the right face in the valve plate 80, as viewed in FIGURE 1, is a circular passage 136. This is best illustrated in FIGURE 6. Intersecting the circular passage 136 is a bore 137 which opens through the periphery of the valve plate 80 and whose end remote from the passage 136 is closed by means of a plug 138. Intersecting the passage 137 is a passage 139 which has an enlarged externally threaded outer portion 140 which opens through the periphery of the valve plate 80. Threadedly engaged in the enlarged outer portion 140 is a fitting 141 of a compressed air line which may be connected to any desired compressed air source.

Figure 5:
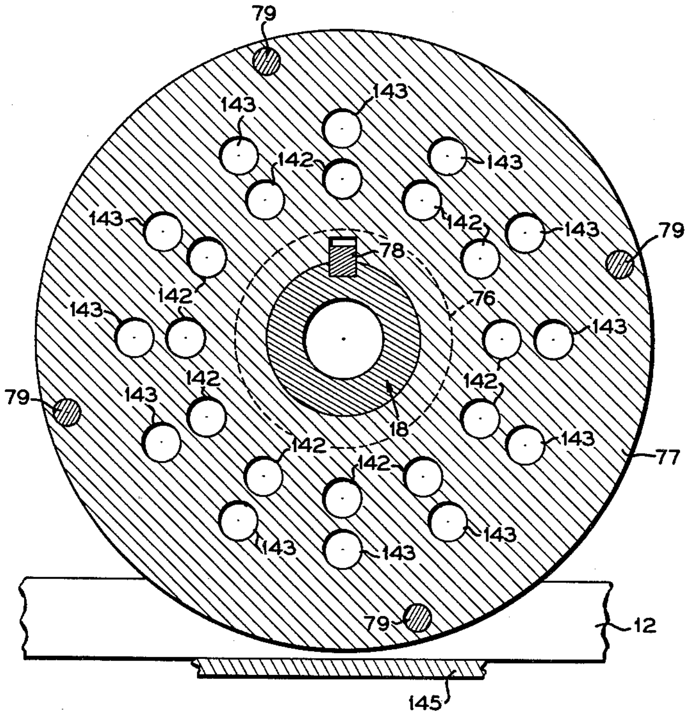
FIGURE 5 is an enlarged fragmentary vertical sectional view taken along the line 5—5 of FIGURE 1 and shows the specific details of a drive plate for the rotor and the arrangement of air passages formed therein.

Referring now to FIGURE 5 in particular, it will be seen that the drive plate 77 is provided with a plurality of circumferentially spaced pairs of passages 142 and 143 therethrough. The passages 142 and 143 of each pair are disposed in radial relation and are alined with the slots 133 in the rotor 75. The passages 142 overlap the recess 131 while the passages 143 overlap the slots 133.

There is also provided a discharge chute which is disposed below the conveyor 5 in alinement with the lower most point of the rotor 75. The discharge chute is referred to by the reference numeral 144 and may be directed toward any desired discharge receptacle. The purpose of the discharge chute 144 will be described in detail hereinafter.

Figure 13:
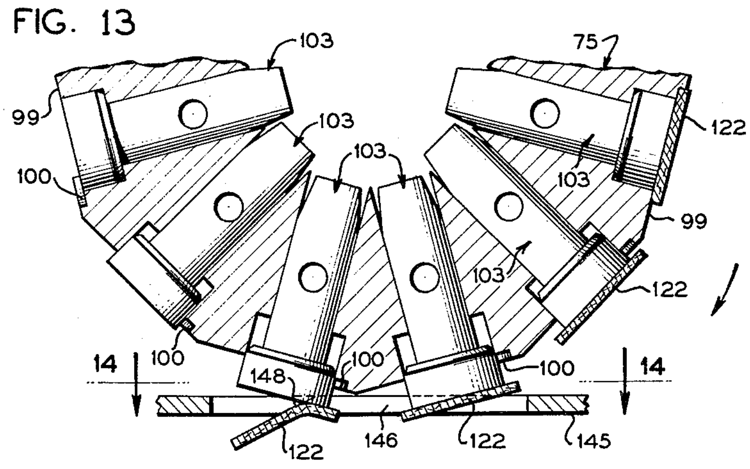
FIGURE 13 is an enlarged fragmentary vertical sectional view taken through the lower part of the rotor and the stripper plate and shows the relationship of a cork disc with respect to one of the plungers and the stripper plate, which cork disc failed to be ejected from the plunger and is in the process of being stripped therefrom by the stripper plate.
Figure 14:
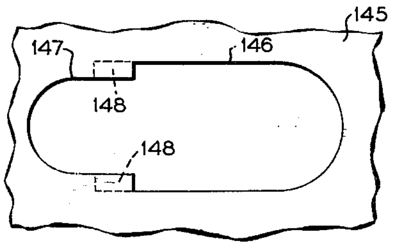
FIGURE 14 is an enlarged fragmentary plan view of the central part of the stripper plate, the view being taken along the line 14—14 of FIGURE 13 and shows the specific outline of the plunger receiving passage in the stripper plate.

Secured to the underside of the plate portion 12 of the base 10 generally in alinement with the rotor 75 is a stripper plate 145. The stripper plate 145, as is best shown in FIGURES 13 and 14, has an elongated slot 146 extending in the plane of the rotor 75. The slot 146 terminates in the direction of rotation of the rotor 75 at the lower end of its travel in a reduced portion 147. Disposed at the intersection of the reduced portion 147 with the main portion of the slot 146 are upwardly sloping cam surfaces 148 which are disposed on opposite sides of the reduced portion 147. The main portion of the slot 146 is of a width to receive a cork disc 122. On the other hand, the reduced portion 147 is reduced in width and will pass only the heads 108 of the plungers 103.

*Operation*

In the operation of the rotary distributor 9, corks are supplied to the cork holder of which the bracket 117 and the stacking pipe 120 are parts. Thus a stack supply of cork discs 122 directly overlie the rotor 75. As the rotor 75 rotates in a clockwise direction, as viewed in FIGURE 2, the shoulder 100 of each of the surfaces 99 sequentially engages a cork disc 122 and removes it from the bushing 119. As the rotor 75 continues to rotate, the cork disc 122 is permitted to seat within the socket defined by the shoulder 100. The rotor rotates through an angle of approximately thirty degrees at which time a vacuum is formed within the associated plunger 103. Referring now to FIGURE 1, it will be seen that the vacuum is supplied through the vacuum line 92, through the passage 90, through the bore 97 and through the bores 98. The vacuum is introduced in the annular recess 131 and in the recess 135 which is communicated with the annular recess 131 by the associated one of the passages 143. The vacuum is then formed in the slot 133 for the associated plunger 103 through the passage 142 alined therewith. Inasmuch as the passage 111 communicates with the slot 133, the vacuum is formed in the interior of the plunger 103 and through the head 108 thereof by means of the passages 109 and 110. Thus the vacuum produced within the plungers 103 serves to hold the cork discs 122 in place as the rotor 75 rotates at a relatively high speed.

At this time the plungers 103 are retracted entirely within the rotor 75. However, due to the shape of the cam track 73 in the cam plate 72, as the particular plunger approaches the bottom of its travel, it is projected out of the rotor 75, as is best shown in FIGURE 2. Thus as the plunger 103 approaches its lower vertical position, the head 108 thereof enters into the slot 146 in the stripper plate 145. When the plunger 103 approaches its vertical position, the vacuum source thereto is beginning to be cutoff so that when the plunger 103 reaches its lower vertical position, the vacuum source is completely cut off. At this time the associated one of the passages 103 begins to become alined with the passage 136 with the result that as the vacuum in the plunger 103 is discontinued, a pressurized source of air is delivered to the plunger 103 so as to forcefully eject the cork disc 122 from the plunger 103 simultaneously with the release thereof. Thus the cork disc 122 is forcefully driven into the empty shell 8 which is alined with the plunger 103 due to the proper timing between the drives for the conveyor 5 and the rotary cork distributor 9.

In the event the conveyor 5 is not completely filled so that the link 6 thereof is empty, the force of the compressed air on the cork disc 122 will be sufficient to drive the cork disc through the conveyor link 6 and into the discharge tube 144. Thus jamming of the conveyor links 6 with cork discs 122 is prevented.

If for some reason the compressed air source should fail and the cork disc 122 is retained on the lower end of the head 108 of its associated plunger 103, as the plunger 103 and the cork disc 122 move upwardly, as viewed in FIGURE 13, the head 108 of the plunger 103 will pass through the reduced portion 147 of the slot in the stripper plate 145 thus stripping the cork disc 122 from the plunger 103.

From the foregoing, it will be readily apparent that the construction of the rotary cork distributor is such that the positive operation thereof is assured. Thus the rotary cork distributor may be driven at high speeds as is necessary in the production assembling of bottle caps, without the usual problem of jamming of either the rotary cork distributor or the endless conveyor resulting.

While one example structure and arrangement of the novel structural features is disclosed herein, it is to be understood that these features can be variously modified without departing from the spirit and scope of the invention as defined in the appended claims.

I claim:

1. A machine for assembling bottle caps comprising a conveyor for conveying empty shells in upwardly opening positions, a cork disc reservoir, and a rotary distributor for distributing and applying cork discs from said reservoir into the shells, said rotary distributor including a base, a generally horizontal shaft, means carried by said base mounting said shaft for rotary movement, a generally vertically disposed rotor mounted on said shaft in overlying alignment with said conveyor, drive means connected to said shaft for rotating said rotor in timed relation to the movement of said conveyor, said rotor underlying said reservoir for receiving cork discs therefrom, said rotor having a plurality of radial circumferentially spaced sockets opening through the periphery thereof, a plunger positioned in each of said rotor sockets, cam means connected to said plungers for retracting and projecting said plungers as said rotor rotates, said rotor having cork disc pick-off means for removing individual cork discs from said reservoir and seating said cork discs in said sockets overlying outer ends of said plungers, cork disc retaining means connected to said plungers for retaining cork discs in engagement with said plungers as said rotor rotates and said plungers are projected from said rotor, and cork disc ejecting means cooperating with said plungers for forcibly removing cork discs from said plungers when projected from said rotor and positioning cork discs in shells.

2. A machine for assembling bottle caps comprising a conveyor for conveying empty shells in upwardly opening positions, a cork disc reservoir, and a rotary distributor for distributing and applying cork discs from said reservoir into the shells, said rotary distributor including a base, a generally horizontal shaft, means carried by said base mounting said shaft for rotary movement, a generally vertically disposed rotor mounted on said shaft in overlying alignment with said conveyor, drive means connected to said shaft for rotating said rotor in timed relation to the movement of said conveyor, said rotor underlying said reservoir for receiving cork discs therefrom, said rotor having a plurality of radial circumferentially spaced sockets opening through the periphery thereof, a plunger positioned in each of said rotor sockets, cam means connected to said plungers for retracting and projecting said plungers as said rotor rotates, said rotor having cork disc pick-off means for removing individual cork discs from said reservoir and seating said cork discs in said sockets overlying outer ends of said plungers, cork disc retaining means connected to said plungers for retaining cork discs in engagement with said plungers as said rotor rotates and said plungers are projected from said rotor, and cork disc ejecting means cooperating with said plungers for forcibly removing cork discs from said plungers when projected from said rotor and positioning cork discs in shells, said cork disc retaining means including a vacuum source, a passage in each of said plungers and opening through the outer end thereof, and other passages communicating said plunger passages with said vacuum source through a predetermined arc of rotation of said rotor whereby cork discs are held on said plunger by vaccum.

3. A machine for assembling bottle caps comprising a conveyor for conveying empty shells in upwardly opening positions, a cork disc reservoir, and a rotary distributor for distributing and applying cork discs from said reservoir into the shells, said rotary distributor including a base, a generally horizontal shaft, means carried by said base mounting said shaft for rotary movement, a generally vertically disposed rotor mounted on said shaft in overlying alignment with said conveyor, drive means connected to said shaft for rotating said rotor in timed relation to the movement of said conveyor, said rotor underlying said reservoir for receiving cork discs therefrom, said rotor having a plurality of radial circumferentially spaced sockets opening through the periphery thereof, a plunger positioned in each of said rotor sockets, cam means connected to said plungers for retracting and projecting said plungers as said rotor rotates, said rotor having cork disc pick-off means for removing individual cork discs from said reservoir and seating said cork discs in said sockets overlying outer ends of said plungers, cork disc retaining means connected to said plungers for retaining cork discs in engagement with said plungers as said rotor rotates, and cork disc ejecting means cooperating with said plungers for forcibly removing cork discs from said plungers and positioning cork discs in shells, said cork disc ejecting means including a pressurized air source, a passage in each of said plungers and opening through the outer end thereof, and a compressed air passage communicating said plunger passages with said pressurized air source when said plungers are aligned with said conveyor whereby cork discs are forcibly ejected by means of the compressed air.

4. A machine for assembling bottle caps comprising a conveyor for conveying empty shells in upwardly opening positions, a cork disc reservoir, and a rotary distributor for distributing and applying cork discs from said reservoir into the shells, said rotary distributor including a base, a generally horizontal shaft, means carried by said base mounting said shaft for rotary movement, a generally vertically disposed rotor mounted on said shaft in overlying alignment with said conveyor, drive means connected to said shaft for rotating said rotor in timed relation to the movement of said conveyor, said rotor underlying said reservoir for receiving cork discs therefrom, said rotor having a plurality of radial circumferentially spaced sockets opening through the periphery thereof, a plunger positioned in each of said rotor sockets, cam means connected to said plungers for retracting and projecting said plungers as said rotor rotates, said rotor having cork disc pick-off means for removing individual cork discs from said reservoir and seating said cork discs in said sockets overlying outer ends of said plungers, cork disc retaining means connected to said plungers for retaining cork discs in engagement with said plungers as said rotor rotates and said plungers are projected from said rotor, and cork disc ejecting means cooperating with said plungers for forcibly removing cork discs from said plungers when projected from said rotor and positioning cork discs in shells, said cork disc retaining means including a vacuum source, a passage in each of said plungers and opening through the outer end thereof, and other pasages communicating said plunger passages with said vacuum source through a predetermined arc of rotation of said rotor whereby cork discs are held on said plunger by vacuum, said cork disc ejecting means including a pressurized air source, and a compressed air passage communicating said plunger passages with said pressurized air source when said plungers are aligned with said conveyor to forcibly project cork discs into shells.

5. A machine for assembling bottle caps comprising a conveyor for conveying empty shells in upwardly opening positions, a cork disc reservoir, and a rotary distributor for distributing and applying cork discs from said reservoir into the shells, said rotary distributor including a base, a generally horizontal shaft, means carried by said base mounting said shaft for rotary movement, a generally vertically disposed rotor mounted on said shaft in overlying alignment with said conveyor, drive means connected to said shaft for rotating said rotor in timed relation to the movement of said conveyor, said rotor underlying said reservoir for receiving cork discs therefrom, said rotor having a plurality of radial circumferentially spaced sockets opening through the periphery thereof, a plunger positioned in each of said rotor sockets, cam means connected to said plungers for retracting and projecting said plungers as said rotor rotates, said rotor having cork disc pick-off means for removing individual cork discs from said reservoir and seating said cork discs in said sockets overlying outer ends of said plungers, cork disc retaining means connected to said plungers for retaining cork discs in engagement with said plungers as said rotor rotates, and cork disc ejecting means cooperating with said plungers for removing cork discs from said plungers and positioning cork disc in shells, said cork disc ejecting means including a pressurized air source, a passage in each of said plungers and opening through the outer end thereof, and a compressed air passage communicating said plunger passages with said pressurized air source when said plungers are aligned with said conveyor whereby cork discs are forcibly ejected by means of the compressed air, said cork disc ejecting means further including a stripper plate overlying said conveyor and cooperating with said plungers to assure the removal of cork discs therefrom to prevent jamming in the event said pressurized air source fails to function.

6. A machine for assembling bottle caps comprising a conveyor for conveying empty shells in upwardly opening positions, a cork disc reservoir, and a rotary distributor for distributing and applying cork discs from said reservoir into the shells, said rotary distributor including a base, a generally horizontal shaft, means carried by said base mounting said shaft for rotary movement, a generally vertically disposed rotor mounted on said shaft in overlying alignment with said conveyor, drive means connected to said shaft for rotating said rotor in timed relation to the movement of said conveyor, said rotor underlying said reservoir for receiving cork discs therefrom, said rotor having a plurality of radial circumferentially spaced sockets opening through the periphery thereof, a plunger positioned in each of said rotor sockets, cam means connected to said plungers for retracting and projecting said plungers as said rotor rotates, said rotor having cork disc pick-off means for removing individual cork discs from said reservoir and seating said cork discs in said sockets overlying outer ends of said plungers, cork disc retaining means connected to said plungers for retaining cork discs in engagement with said plungers as said rotor rotates, and cork disc ejecting means cooperating with said plungers for removing cork discs from said plungers and positioning cork discs in shells, said cork disc ejecting means including a pressurized air source, a passage in each of said plungers and opening through the outer end thereof, and a compressed air passage communicating said plunger passages with said pressurized air source when said plungers are aligned with said conveyor whereby cork discs are forcibly ejected by means of the compressed air, said cam means including a cam plate having a cam track formed therein and a roller connected to each of said plungers seated in said cam track, said cork disc ejecting means further including a stripper plate overlying said conveyor and cooperating with said plungers to assure the removal of cork discs therefrom to prevent jamming in the event said pressurized air source fails to function.

7. A machine for assembling bottle caps comprising a conveyor for conveying empty shells in upwardly opening positions, a cork disc reservoir, and a rotary distributor for distributing and applying cork discs from said reservoir into the shells, said rotary distributor including a base, a generally horizontal shaft, means carried by said base mounting said shaft for rotary movement, a generally vertically disposed rotor mounted on said shaft in overlying alignment with said conveyor, drive means connected to said shaft for rotating said rotor in timed relation to the movement of said conveyor, said rotor underlying said reservoir for receiving cork discs therefrom, said rotor having a plurality of radial circumferentially spaced sockets opening through the periphery thereof, a plunger positioned in each of said rotor sockets, said rotor having cork disc pick-off means for removing individual cork discs from said reservoir and seating said cork discs in said sockets overlying outer ends of said plungers, cork disc retaining means connected to said plungers for retaining cork discs in engagement with said plungers as said rotor rotates, and cork disc ejecting means cooperating with said plungers for forcibly removing cork discs from said plungers and positioning cork discs in shells, said cork disc ejecting means including a pressurized air source, a passage in each of said plungers and opening through the outer end thereof, and a compressed air passage communicating said plunger passages with said pressurized air source when said plungers are aligned with said conveyor whereby cork discs are forcibly ejected by means of the compressed air.

8. In a dispenser for placing cork discs into bottle cap shells, a drive shaft, means mounting said drive shaft for rotation, a drive plate secured to said drive shaft for rotation therewith, a rotor secured to said drive plate in face-to-face relation, said rotor having a plurality of radiating sockets opening through the periphery thereof, a plunger positioned in each of said rotor sockets, each plunger having a cork engaging head with at least one fluid passage opening therethrough, the other end of said fluid passage opening through the side wall of said plunger, said shaft being tubular and having an axial fluid passage partially therethrough, a vacuum line connected to said shaft in communication with the passage thereof, an annular inner fluid passage in the face of said rotor opposing said drive plate with a wall of said annular fluid passage being defined by said drive plate, outer fluid passages extending through said rotor drive plate opposing face and opening into said sockets, a fixed valve plate opposing the face of said drive plate remote from said rotor, a first set of passages through said drive plate in communication with said rotor inner passage and a second set of passages in said drive plate in comunication with said rotor outer passages, and a fluid flow control passage in said valve plate opposing said drive plate, said fluid flow control passage being of a width to bridge adjacent passages of said first and second sets of passages and of a partial circumferential extent whereby communication of said plunger fluid passages with said vacuum line is restricted to a predetermined arcuate extent as said rotor rotates.

9. The device of claim 8 wherein said valve plate has a second fluid passage opening through the drive plate opposing face thereof in alignment with the path of said drive plate second set of passages for momentary communication therewith as said rotor and drive plate rotate, and a pressurized air line connected to said valve plate second fluid passage for momentarily directing pressurized air through said plunger fluid passages to forcibly eject cork discs from said plunger heads.

10. The device of claim 8 wherein said valve plate has a second fluid passage opening through the drive plate opposing face thereof in alignment with the path of said drive plate second set of passages for momentary communication therewith as said rotor and drive plate rotate, and a pressurized air line connected to said valve plate second fluid passage for momentarily directing pressurized air through said plunger fluid passages to forcibly eject cork discs from said plunger heads, said valve plate second fluid passage being disposed in closely spaced relation to one end of said valve plate flow control passage whereby the compressed air acts on a cork disc prior to the release thereof due to the absence of a holding vacuum in the associated plunger head.

11. The device of claim 8 wherein said drive shaft mounting means includes a fixed support, the connection between said vacuum line and said drive shaft including a rotatable fitting secured to one side of said support, said valve plate being connected to the opposite side of said support for limited movement axially of said drive shaft, and springs disposed between said support and said valve plate retaining said valve plate in face-to-face engagement with said drive plate.

12. The device of claim 8 together with a fixed cam plate disposed adjacent said rotor remote from said drive plate, said cam plate having a cam groove formed in the face thereof opposing said rotor, a projection on each of said plungers projecting through said rotor towards said cam plate, and a follower carried by each plunger projection engaged in said cam groove for projecting and retracting said plungers relative to said rotor as said rotor and plungers rotate as a unit.

References Cited in the file of this patent

UNITED STATES PATENTS

| | | |
|---|---|---|
| 1,574,913 | McManus | Mar. 2, 1926 |
| 1,745,589 | Smith | Feb. 4, 1930 |
| 2,600,138 | Tesch | June 10, 1952 |